(12) United States Patent
Shen et al.

(10) Patent No.: US 10,497,148 B2
(45) Date of Patent: Dec. 3, 2019

(54) SKIN UNDERTONE DETERMINING METHOD AND AN ELECTRONIC DEVICE

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 112 days.

(21) Appl. No.: 15/871,092

(22) Filed: Jan. 15, 2018

(65) Prior Publication Data

US 2019/0035111 A1    Jan. 31, 2019

(30) Foreign Application Priority Data

Jul. 25, 2017    (CN) .......................... 2017 1 0610202

(51) Int. Cl.
*G06T 7/90*    (2017.01)
*G06T 7/00*    (2017.01)
*G06K 9/00*    (2006.01)
*G06K 9/46*    (2006.01)

(52) U.S. Cl.
CPC ............ *G06T 7/90* (2017.01); *G06K 9/00221* (2013.01); *G06K 9/00362* (2013.01); *G06K 9/00369* (2013.01); *G06K 9/4652* (2013.01); *G06T 7/97* (2017.01)

(58) Field of Classification Search
CPC ......... G06T 7/90; G06T 7/97; G06K 9/00362; G06K 9/4652; G06K 9/00369; G06K 9/00221
See application file for complete search history.

(56) References Cited

U.S. PATENT DOCUMENTS

| | | | |
|---|---|---|---|
| 8,693,768 B1 * | 4/2014 | LaForgia | A45D 44/005 222/1 |
| 9,064,279 B1 * | 6/2015 | Tuan | G06Q 30/0631 |
| 9,519,927 B1 | 12/2016 | Tuan et al. | |
| 9,996,981 B1 * | 6/2018 | Tran | A43D 1/025 |

(Continued)

FOREIGN PATENT DOCUMENTS

KR        20150141989        12/2015

OTHER PUBLICATIONS

"Office Action of Japan Counterpart Application," dated May 14, 2019, p. 1-p. 3.

(Continued)

*Primary Examiner* — Ming Y Hon
(74) *Attorney, Agent, or Firm* — JCIPRNET (57) ABSTRACT

A skin undertone determining method and an electronic device are provided. The method includes: obtaining a first image; obtaining a first parameter value and a second parameter value in a first color space according to the first image; obtaining a third parameter value in a second color space according to the first image; and determining a skin undertone of skin in the first image according to the first parameter value, the second parameter value, and the third parameter value. Accordingly, it is able to know that the skin in the first image has warm undertones or cool undertones.

32 Claims, 4 Drawing Sheets

(56) References Cited

U.S. PATENT DOCUMENTS

| | | | |
|---|---|---|---|
| 2003/0007684 A1* | 1/2003 | Kato | A45D 44/005 382/165 |
| 2005/0011959 A1* | 1/2005 | Grosvenor | H04N 7/18 235/470 |
| 2009/0054744 A1* | 2/2009 | Kitamura | A61B 5/0082 600/306 |
| 2009/0263013 A1 | 10/2009 | Xiong et al. | |
| 2012/0113241 A1* | 5/2012 | Sundaresan | G06F 3/017 348/77 |
| 2013/0300761 A1* | 11/2013 | Ahmed | G01J 3/463 345/595 |
| 2014/0177955 A1* | 6/2014 | Srinivasan | G06K 9/4652 382/165 |
| 2015/0186965 A1* | 7/2015 | Paul | G06F 16/381 705/26.41 |
| 2015/0339757 A1* | 11/2015 | Aarabi | G06Q 30/06 705/12 |
| 2016/0073955 A1* | 3/2016 | Salem | A61B 5/6831 600/583 |
| 2016/0210602 A1 | 7/2016 | Siddique et al. | |

OTHER PUBLICATIONS

"Search Report of European Counterpart Application," dated Sep. 25, 2018, pp. 1-10.

Elbouz; M. et al, "Correlation based efficient face recognition and color change detection," Optics Communications, vol. 311, Jan. 15, 2013, pp. 186-200.

Al-Tairi; Zaher Hamid et al, "Skin Segmentation Using YUV and RGB Color Spaces," Journal of Information Processing System, vol. 10, No. 2, Jun. 30, 2014, pp. 283-299.

Jusoh; Rizal Mat et al, "Skin detection based on thresholding in RGB and hue component," 2010 IEEE Symposium on Industrial Electronics and Applications (ISIEA), Oct. 3-5, 2010, pp. 515-517.

* cited by examiner

SKIN UNDERTONE DETERMINING METHOD AND AN ELECTRONIC DEVICE

CROSS-REFERENCE TO RELATED APPLICATION

This application claims the priority benefit of China application serial no. 201710610202.1, filed on Jul. 25, 2017. The entirety of the above-mentioned patent application is hereby incorporated by reference herein and made a part of this specification.

BACKGROUND OF THE INVENTION

1. Field of the Invention

The invention relates to a skin undertone determining method. More particularly, the invention relates to a skin undertone determining method combining two color spaces for making determination and an electronic device.

2. Description of Related Art

When wearing makeup, most of the people choose foundation colors of foundation makeup according to skin undertones of their own. Nevertheless, it is difficult for most of the people to effectively and clearly find out the skin undertones of themselves and thus fail to choose the matching foundation colors of the foundation makeup according to their skin undertones. Therefore, how to effectively and clearly find out the skin undertones is an issue that needs to be overcome.

SUMMARY OF THE INVENTION

The invention provides a skin undertone determining method and an electronic device which are able to effectively and clearly obtain a skin undertone of a user.

The invention provides a skin undertone determining method including: obtaining a first image; obtaining a first parameter value and a second parameter value in a first color space according to the first image; obtaining a third parameter value in a second color space according to the first image; and determining a skin undertone of skin in the first image according to the first parameter value, the second parameter value, and the third parameter value.

In an embodiment of the invention, wherein the step of obtaining the first image includes: obtaining a second image, wherein the second image includes a face and neck of a human body; defining a plurality of reference points in a border of the face and neck in the second image; selecting a first reference point in the reference points, wherein a coordinate of the first reference point in a first direction is less than coordinates of other reference points in the reference points in the first direction; determining a position of a baseline in the second image according to the coordinate of the first reference point in the first direction and a predetermined offset, wherein a coordinate of the baseline in the first direction is less than the coordinate of the first reference point in the first direction; determining a feature area in the second image according to the reference points and the baseline; and obtaining the first image according to the feature area.

In an embodiment of the invention, wherein the step of determining the skin undertone of skin in the first image according to the first parameter value, the second parameter value, and the third parameter value includes: determining the skin undertone of skin in the first image has warm undertones when the first parameter value is greater than a first threshold, the second parameter value is greater than a second threshold, the second parameter value is less than a third threshold, and the third parameter value is less than a fourth threshold; and determining the skin undertone of skin in the first image has cool undertones when the first parameter value is less than the first threshold, the second parameter value is greater than a fifth threshold, the second parameter value is less than a sixth threshold, and the third parameter value is greater than a fourth threshold.

In an embodiment of the invention, wherein the step of obtaining the first parameter value and the second parameter value in the first color space includes: calculating an average value of color in the first image; and obtaining the first parameter value and the second parameter value of the average value of color in the first color space.

In an embodiment of the invention, wherein the step of obtaining the third parameter value in the second color space includes: obtaining the third parameter value of the average value of color in the second color space.

In an embodiment of the invention, wherein the first color space is a HSV color space, the first parameter value is a hue value in the HSV color space, and the second parameter value is a luminance value in the HSV color space.

In an embodiment of the invention, the second color space is a RGB color space, and the third parameter value is a blue value in the RGB color space.

In an embodiment of the invention, the method further includes: determining a corresponding foundation color according to the skin undertone determined and outputting a foundation color recommendation message according to the foundation color.

In an embodiment of the invention, the first image obtained includes only the neck of the human body or only a portion of the neck of the human body.

The invention further provides an electronic device, and the electronic device includes a storage unit and a processing unit. The storage unit is configured to store a plurality of modules. The processing unit is coupled to the storage unit and configured to access and execute the modules stored in the storage unit. The modules include an image obtaining module and a determination module. The image obtaining module obtains a first image. The determination module obtains a first parameter value and a second parameter value in a first color space according to the first image. The determination module further obtains a third parameter value in a second color space according to the first image. The determination module further determines a skin undertone of skin in the first image according to the first parameter value, the second parameter value, and the third parameter value.

In an embodiment of the invention, wherein in the operation of obtaining the first image, the image obtaining module obtains a second image, wherein the second image includes a face and neck of a human body; a plurality of reference points are defined in a border of the face and neck in the second image; a first reference point is selected in the reference points, wherein a coordinate of the first reference point in a first direction is less than coordinates of other reference points in the reference points in the first direction; a position of a baseline is determined in the second image according to the coordinate of the first reference point in the first direction and a predetermined offset, wherein a coordinate of the baseline in the first direction is less than the coordinate of the first reference point in the first direction; a feature area is determined in the second image according to the reference points and the baseline; and the first image is obtained according to the feature area.

In an embodiment of the invention, wherein in the operation of determining the skin undertone of skin in the first image according to the first parameter value, the second parameter value, and the third parameter value, the determination module determines the skin undertone of skin in the first image has warm undertones when the first parameter value is greater than a first threshold, the second parameter value is greater than a second threshold, the second parameter value is less than a third threshold, and the third parameter value is less than a fourth threshold; and the determination module determines the skin undertone of skin in the first image has cool undertones when the first parameter value is less than the first threshold, the second parameter value is greater than a fifth threshold, the second parameter value is less than a sixth threshold, and the third parameter value is greater than a fourth threshold.

In an embodiment of the invention, wherein in the operation of obtaining the first parameter value and the second parameter value in the first color space, the determination module calculates an average value of color in the first image and obtains the first parameter value and the second parameter value of the average value of color in the first color space.

In an embodiment of the invention, wherein in the operation of obtaining the third parameter value in the second color space, the determination module obtains the third parameter value of the average value of color in the second color space.

In an embodiment of the invention, wherein the first color space is a HSV color space, the first parameter value is a hue value in the HSV color space, and the second parameter value is a luminance value in the HSV color space.

In an embodiment of the invention, wherein the second color space is a RGB color space, and the third parameter value is a blue value in the RGB color space.

In an embodiment of the invention, the modules further include an output module. The output module determines a corresponding foundation color according to the skin undertone determined, and the output module outputs a foundation color recommendation message according to the foundation color.

In an embodiment of the invention, the first image obtained includes only the neck of the human body or only a portion of the neck of the human body.

To sum up, the skin undertone determining method and the electronic device provided by the embodiments of the invention may effectively and clearly obtain the skin undertone of the user and correspondingly recommend the foundation color to the user, such that the user is able to decide the color of the foundation makeup with ease.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
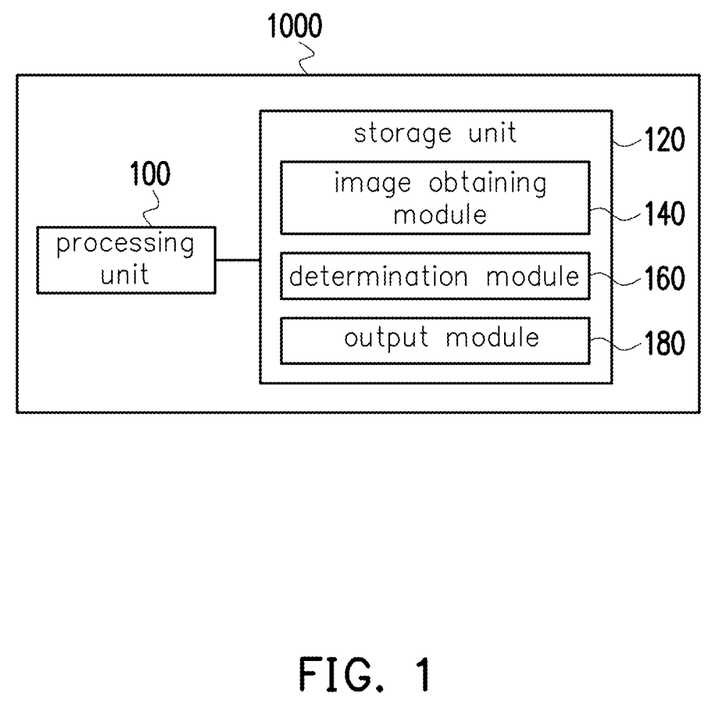
FIG. 1 is a schematic block diagram illustrating an electronic device according to an embodiment of the invention.

FIG. 1 is a schematic block diagram illustrating an electronic device according to an embodiment of the invention. Referring to FIG. 1, an electronic device 1000 at least includes a processing unit 100 and a storage unit 120. Moreover, the processing unit 100 is coupled to the storage unit 120, but the invention is not limited thereto. In an embodiment of the invention, the electronic device 1000 may be a server, a smart mobile device, a desktop computer, a notebook computer, a workstation, a personal digital assistant (PDA), etc., but the invention is not limited thereto.

The processing unit 100 may be a central processing unit (CPU) or other programmable microprocessor for general use or special use, a digital signal processor (DSP), a programmable controller, an application specific integrated circuit (ASIC), other similar device, or a combination of the foregoing.

The storage unit 120 may be a fixed or a movable random access memory (RAM) in any form, a read-only memory (ROM), a flash memory, other similar device, or a combination of the foregoing.

In the present embodiment, a plurality of program code snippets are stored in the storage unit 120 of the electronic device 1000, and the program code snippets are executed by the processing unit 100 after being installed. For instance, a plurality of modules including an image obtaining module 140, a determination module 160, and an output module 180 are stored in the storage unit 120. Various operations applied to the electronic device 1000 are respectively executed through the modules, wherein each of the modules is formed by one program code snippet or the program code snippets. Note that the storage unit 120 in the foregoing embodiment is not limited to a single memory device, and the foregoing modules may also be separately stored in two or more than two memory devices of identical or different types. In the rest of the embodiments of the invention, the foregoing modules are further, for example, respectively implemented through specific circuit structures.

In an embodiment of the invention, the electronic device 1000 further includes devices such as an output and input interface (not shown) and a communication interface (not shown), but the invention is not limited thereto. Specifically, the output and input interface includes devices configured for outputting or inputting messages and data, such as a display, a speaker, a keyboard, a mouse, a touch panel, etc. On the other hand, the communication interface supports various wired communication standards and wireless communication standards, such that the electronic device 1000 is able to be connected to other devices.

A skin undertone determining method provided by the embodiments of the invention may be implemented in the electronic device 1000 illustrated in FIG. 1. Several embodiments are introduced in the following in association with the accompanied electronic device 1000 illustrated in FIG. 1 to further illustrate the foregoing analysis method. It is worth noting that the skin undertone determining method is not limited to be implemented merely on the electronic device 1000, or rather the foregoing analysis method may be implemented on other electronic devices or systems equipped with corresponding capabilities.

Figure 2:
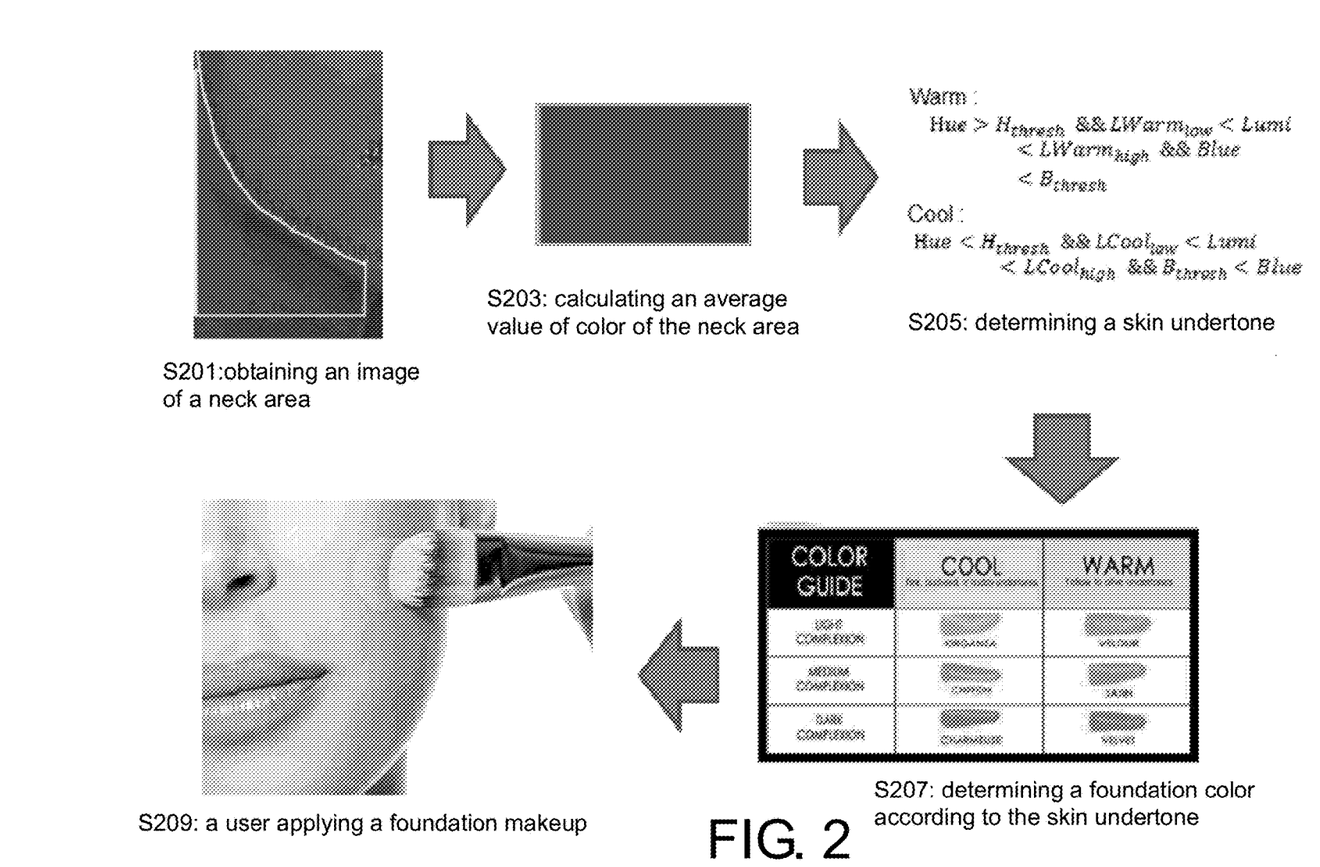
FIG. 2 is a schematic flowchart of determining a skin undertone according to an embodiment of the invention.

FIG. 2 is a schematic flowchart of determining a skin undertone according to an embodiment of the invention. Referring to FIG. 2, in step S201, the image obtaining module 140 may obtain an image of a neck area of a person being captured. Note that the neck area of the human body is not exposed to the sun often compared to the face, such that the skin color of the neck area is closer to the person's real skin color. Based on the above, an image of the neck area is used in the invention to perform analysis.

Figure 3A:
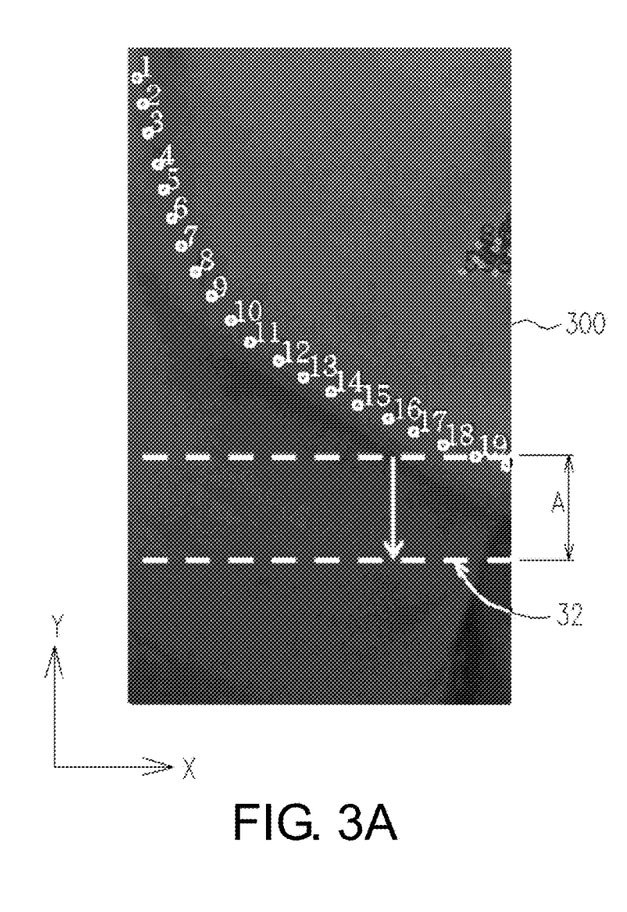
FIG. 3A and FIG. 3B are schematic diagrams illustrating obtaining an image of a neck area of a user according to an embodiment of the invention.
Figure 3B:
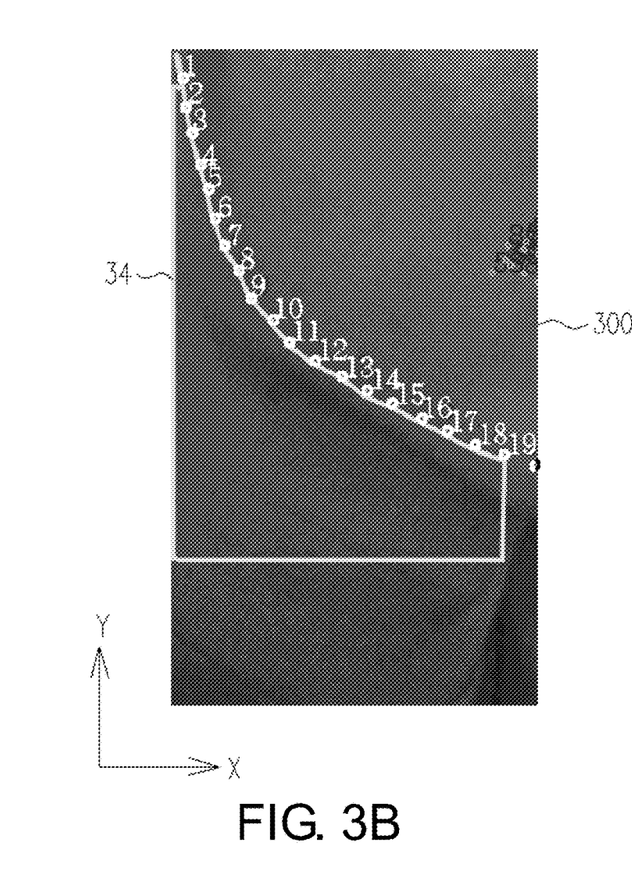

Specifically, FIG. 3A and FIG. 3B are schematic diagrams of obtaining an image of a neck area of a user according to an embodiment of the invention. Referring to FIG. 3A and FIG. 3B, the image obtaining module 140 may obtain an image 300 (a.k.a. a second image) including both the face and neck parts of the person being captured (or the human body) from the storage unit 120. In an exemplary embodiment, the image 300 is, for example, generated by the electronic device 1000 after capturing the image with an image obtaining unit (not shown). However, the invention is not intended to limit the method for obtaining the image 300. In particular, in another embodiment of the invention, the first image may include only the neck of the human body or a portion of the neck of the human body.

After obtaining the image 300, the image obtaining module 140 defines a border of the face and neck formed by reference points 1 to 19 in the image 300.

Next, the image obtaining module 140 selects the reference point 19 (a.k.a. a first reference point) from the reference points 1 to 19. Herein, a coordinate (a.k.a. a Y-coordinate) of the reference point 19 in a Y-coordinate direction (a.k.a. a first direction) is less than Y-coordinates of other reference points in the reference points 1 to 19. In other words, the Y-coordinate of the reference point 19 is less than the Y-coordinates of the reference points 1 to 18.

Afterwards, the image obtaining module 140 determines a position of a baseline 32 in the image 300 according to the Y-coordinate of the reference point 19 and a predetermined offset A, wherein a Y-coordinate of the baseline 32 is less than the Y-coordinate of the reference point 19. In other words, the base line 32 is located at a position extended downwardly from the Y-coordinate of the reference point 19 by a predetermined offset A, and the baseline 32 is a horizontal line. In the present exemplary embodiment, the predetermined offset A is a fixed value between 100 and 150 pixels, for example. Nevertheless, the invention is not intended to limit the value of the predetermined offset A.

Next, referring to FIG. 3B, the image obtaining module 140 determines a feature area 34 in the image 300 according to the reference points 1 to 19 and the baseline 32, and the image obtaining module 140 obtains (or acquires) an image (a.k.a. the first image) in the feature area 34. Note that the feature area 34 is the neck area of the person being captured in the image 300.

It is worth noting that in an exemplary embodiment, if an input image is obtained through directly capturing the neck area of the person being captured, the image obtaining module 140 may directly perform analysis by using the input image obtained without executing the foregoing method of identifying the neck area.

Referring to FIG. 2 again, in step S203, the determination module 160 calculates an average value of color in the first image. Specifically, the determination module 160 averages colors of each of the pixels in the first image. Next, in step S205, the determination module 160 determines a skin undertone of the person being captured according to the average value of color in the first image.

Specifically, after calculating the average value of color in the first image, in step S205, the determination module 160 obtains a hue value (a.k.a. a first parameter value) and a luminance value (a.k.a. a second parameter value) in the HSV color space (a.k.a. a first color space) of the average value of color and also obtains a blue (B, Blue) value (a.k.a. a third parameter value) in the RGB color space (a.k.a. a second color space) of the average value of color. Next, the determination module 160 determines the skin undertone of skin in the first image according to the first parameter value, the second parameter value, and the third parameter value.

In the present exemplary embodiment, when the first parameter value, the second parameter value, and the third parameter value satisfies the following formula (1), the skin undertone of skin in the first image is determined to have warm undertones. The formula (1) is presented as follows:

$$\text{Hue} > H_{thresh} \&\& LWarm_{low} < \text{Lumi} < LWarm_{high} \&\& \text{Blue} < B_{thresh} \quad \text{formula (1)}$$

Herein, a hue value Hue represents the first parameter value. A luminance value Lumi represents the second parameter value. A blue value Blue represents the third parameter value. A threshold $H_{thresh}$ (a.k.a. a first threshold) is a value between 15 and 25. A threshold $LWarm_{low}$ (a.k.a. a second threshold) is a value between 150 and 170. A threshold $LWarm_{high}$ (a.k.a. a third threshold) is a value between 190 and 200. A threshold $B_{thresh}$ (a.k.a. a fourth threshold) is a value between 150 and 165. In other words, when the first parameter value is greater than the first threshold, the second parameter value is greater than the second threshold, the second parameter value is less than the third threshold, and the third parameter value is less than the fourth threshold, the determination module 160 determines the skin undertone of skin in the first image has warm undertones.

In the present exemplary embodiment, when the first parameter value, the second parameter value, and the third parameter value satisfies the following formula (2), the skin undertone of skin in the first image is determined to have cool undertones. The formula (2) is presented as follows:

$$\text{Hue} < H_{thresh} \&\& LCool_{low} < \text{Lumi} < LCool_{high} \&\& B_{thresh} < \text{Blue} \quad \text{formula (2)}$$

Herein, a hue value Hue represents the first parameter value. A luminance value Lumi represents the second parameter value. A blue value Blue represents the third parameter value. A threshold $H_{thresh}$ (a.k.a. a first threshold) is a value between 15 and 25. A threshold $LCool_{low}$ (a.k.a. a fifth threshold) is a value between 170 and 190. A threshold $LCool_{high}$ (a.k.a. a sixth threshold) is a value between 210 and 220. A threshold $B_{thresh}$ (a.k.a. a fourth threshold) is a value between 150 and 165. In other words, when the first parameter value is less than the first threshold, the second parameter value is greater than the fifth threshold, the second parameter value is less than the sixth threshold, and the third parameter value is greater than the fourth threshold, the determination module 160 determines the skin undertone of skin in the first image has cool undertones.

Note that the invention is not intended to limit the values of the first threshold, the second threshold, the third threshold, the fourth threshold, the fifth threshold, and the sixth threshold.

Next, referring to FIG. 2 again, in step S207, the determination module 160 determines a corresponding foundation color according to the skin undertone determined and outputs a foundation color recommendation message through the output module 180 according to the foundation color. For instance, when the skin undertone has the warm undertones, the determination module 160 may determine the corresponding foundation color is red or brown, and the output module 180 may, for example, correspondingly output (or display) a recommendation message of a foundation product with the foundation color of red or brown to a user through a screen. Alternatively, when the skin undertone has the cool undertones, the determination module 160 may determine the corresponding foundation color is white or green, and the output module 180 may, for example, correspondingly output (or display) a recommendation message of a foundation product with the foundation color of white or green to the user through the screen. Afterwards, in step S209, the user (or the person being captured) may be able to choose the foundation product with the appropriate foundation color according to the recommendation message and apply the foundation makeup on the cheek, neck, etc.

Figure 4:
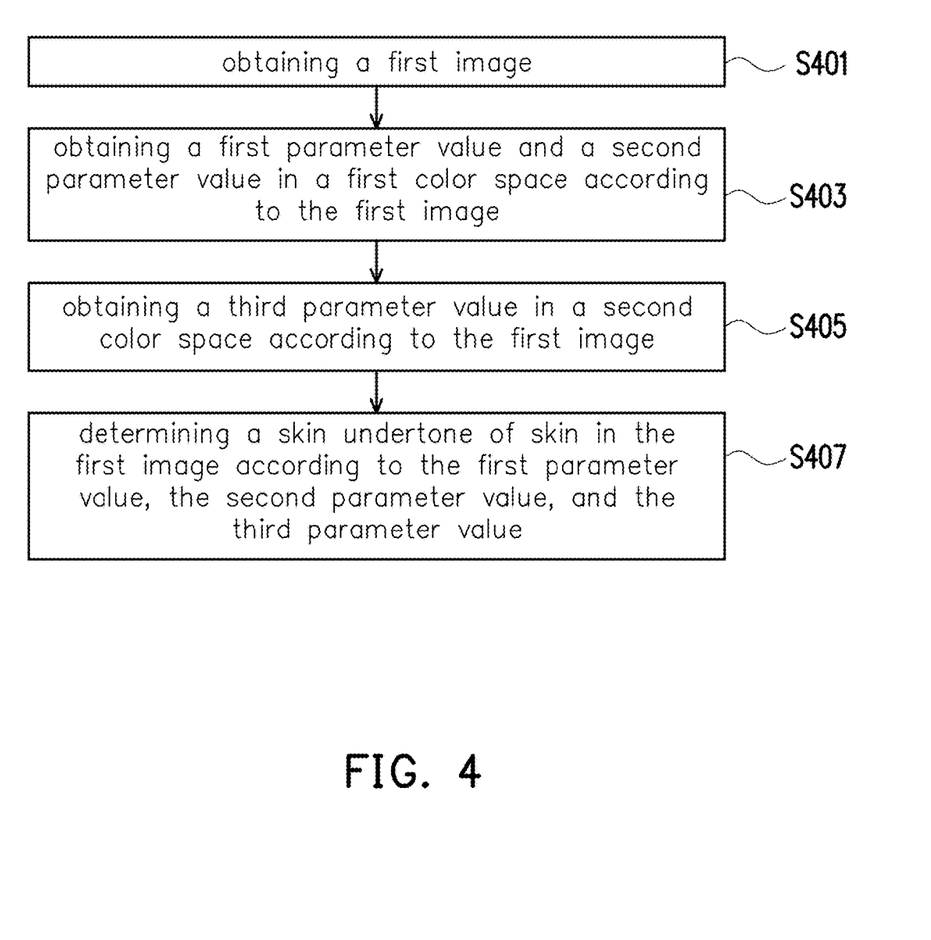
FIG. 4 is a flowchart illustrating a method of determining a skin undertone according to an embodiment of the invention.

FIG. 4 is a flowchart illustrating a method of determining a skin undertone according to an embodiment of the invention. Referring to FIG. 4, in step S401, the image obtaining module 140 obtains the first image. In step S403, the determination module 160 obtains the first parameter value and the second parameter value in the first color space according to the first image. In step S405, the determination module 160 obtains the third parameter value in the second color space according to the first image. Finally, in step S407, the determination module 160 determines the skin undertone of skin in the first image according to the first parameter value, the second parameter value, and the third parameter value. Note that in an exemplary embodiment, the foregoing process may be executed by executing step S405 before executing step S403.

In view of the foregoing, the skin undertone determining method and the electronic device provided by the embodiments of the invention may effectively and clearly obtain the skin undertone of the user and correspondingly recommend the foundation color to the user, such that the user is able to decide the color of the foundation makeup with ease.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A skin undertone determining method, comprising:
obtaining a first image;
obtaining a first parameter value and a second parameter value in a first color space according to the first image;
obtaining a third parameter value in a second color space according to the first image; and
determining a skin undertone of skin in the first image according to the first parameter value, the second parameter value, and the third parameter value,
wherein the step of obtaining the first image comprises:
obtaining a second image, wherein the second image comprises a face and neck of a human body;
defining a plurality of reference points in a border of the face and neck in the second image;
selecting a first reference point in the reference points, wherein a coordinate of the first reference point in a first direction is less than coordinates of other reference points in the reference points in the first direction;
determining a position of a baseline in the second image according to the coordinate of the first reference point in the first direction and a predetermined offset, wherein a coordinate of the baseline in the first direction is less than the coordinate of the first reference point in the first direction;
determining a feature area in the second image according to the reference points and the baseline; and
obtaining the first image according to the feature area.

2. The skin undertone determining method as claimed in claim 1, wherein the step of determining the skin undertone of skin in the first image according to the first parameter value, the second parameter value, and the third parameter value comprises:
determining the skin undertone of skin in the first image has warm undertones when the first parameter value is greater than a first threshold, the second parameter value is greater than a second threshold, the second parameter value is less than a third threshold, and the third parameter value is less than a fourth threshold; and
determining the skin undertone of skin in the first image has cool undertones when the first parameter value is less than the first threshold, the second parameter value is greater than a fifth threshold, the second parameter value is less than a sixth threshold, and the third parameter value is greater than a fourth threshold.

3. The skin undertone determining method as claimed in claim 1, wherein the step of obtaining the first parameter value and the second parameter value in the first color space comprises:
calculating an average value of color in the first image; and
obtaining the first parameter value and the second parameter value of the average value of color in the first color space.

4. The skin undertone determining method as claimed in claim 3, wherein the step of obtaining the third parameter value in the second color space comprises:
obtaining the third parameter value of the average value of color in the second color space.

5. The skin undertone determining method as claimed in claim 1, wherein the first color space is a HSV color space, the first parameter value is a hue value in the HSV color space, and the second parameter value is a luminance value in the HSV color space.

6. The skin undertone determining method as claimed in claim 1, wherein the second color space is a RGB color space, and the third parameter value is a blue value in the RGB color space.

7. The skin undertone determining method as claimed in claim 1, further comprising:
determining a corresponding foundation color according to the skin undertone determined and outputting a foundation color recommendation message according to the foundation color.

8. The skin undertone determining method as claimed in claim 1, wherein the first image obtained comprises only the neck of the human body or only a portion of the neck of the human body.

9. An electronic device, comprising,
a storage unit configured to store a plurality of modules; and a processing unit coupled to the storage unit and configured to access and execute the modules stored in the storage unit, the modules comprising:
an image obtaining module configured to obtain a first image; and
a determination module, obtaining a first parameter value and a second parameter value in a first color space according to the first image,
obtaining a third parameter value in a second color space according to the first image, and
determining a skin undertone of skin in the first image according to the first parameter value, the second parameter value, and the third parameter value,
wherein in the operation of obtaining the first image,
the image obtaining module obtaining a second image comprising a face and neck of a human body,
defining a plurality of reference points in a border of the face and neck in the second image,
selecting a first reference point in the reference points, wherein a coordinate of the first reference point in a first direction is less than coordinates of other reference points in the reference points in the first direction,
determining a position of a baseline in the second image according to the coordinate of the first reference point in the first direction and a predetermined offset, wherein a coordinate of the baseline in the first direction is less than the coordinate of the first reference point in the first direction,
determining a feature area in the second image according to the reference points and the baseline, and
obtaining the first image according to the feature area.

10. The electronic device as claimed in claim 9, wherein in the operation of determining the skin undertone of skin in the first image according to the first parameter value, the second parameter value, and the third parameter value,
the determination module determines the skin undertone of skin in the first image has warm undertones when the first parameter value is greater than a first threshold, the second parameter value is greater than a second threshold, the second parameter value is less than a third threshold, and the third parameter value is less than a fourth threshold, and
the determination module determines the skin undertone of skin in the first image has cool undertones when the first parameter value is less than the first threshold, the second parameter value is greater than a fifth threshold, the second parameter value is less than a sixth threshold, and the third parameter value is greater than a fourth threshold.

11. The electronic device as claimed in claim 9, wherein in the operation of obtaining the first parameter value and the second parameter value in the first color space,
the determination module calculates an average value of color in the first mage and
obtains the first parameter value and the second parameter value of the average value of color in the first color space.

12. The electronic device as claimed in claim 11, wherein in the operation of obtaining the third parameter value in the second color space,
the determination module obtains the third parameter value of the average value of color in the second color space.

13. The electronic device as claimed in claim 9, wherein the first color space is a HSV color space, the first parameter value is a hue value in the HSV color space, and the second parameter value is a luminance value in the HSV color space.

14. The electronic device as claimed in claim 9, wherein the second color space is a RGB color space, and the third parameter value is a blue value in the RGB color space.

15. The electronic device as claimed in claim 9, each of the modules further comprising:
an output module, the determination module determining a corresponding foundation color according to the skin undertone determined, and the output module outputting a foundation color recommendation message according to the foundation color.

16. The electronic device as claimed in claim 9, wherein in the operation of obtaining the first image, the first image obtained by the image obtaining module comprises only the neck of the human body or only a portion of the neck of the human body.

17. A skin undertone determining method, comprising:
obtaining a first image;
obtaining a first parameter value and a second parameter value in a first color space according to the first image;
obtaining a third parameter value in a second color space according to the first image; and
determining a skin undertone of skin in the first image according to the first parameter value, the second parameter value, and the third parameter value,
wherein the step of determining the skin undertone of skin in the first image according to the first parameter value, the second parameter value, and the third parameter value comprises:
determining the skin undertone of skin in the first image has warm undertones when the first parameter value is greater than a first threshold, the second parameter value is greater than a second threshold, the second parameter value is less than a third threshold, and the third parameter value is less than a fourth threshold; and
determining the skin undertone of skin in the first image has cool undertones when the first parameter value is less than the first threshold, the second parameter value is greater than a fifth threshold, the second parameter value is less than a sixth threshold, and the third parameter value is greater than a fourth threshold.

18. The skin undertone determining method as claimed in claim 17, wherein the step of obtaining the first image comprises:
obtaining a second image, wherein the second image comprises a face and neck of a human body;
defining a plurality of reference points in a border of the face and neck in the second image;
selecting a first reference point in the reference points, wherein a coordinate of the first reference point in a first direction is less than coordinates of other reference points in the reference points in the first direction;
determining a position of a baseline in the second image according to the coordinate of the first reference point in the first direction and a predetermined offset, wherein a coordinate of the baseline in the first direction is less than the coordinate of the first reference point in the first direction;
determining a feature area in the second image according to the reference points and the baseline; and
obtaining the first image according to the feature area.

19. The skin undertone determining method as claimed in claim 17, wherein the step of obtaining the first parameter value and the second parameter value in the first color space comprises:
calculating an average value of color in the first image; and
obtaining the first parameter value and the second parameter value of the average value of color in the first color space.

20. The skin undertone determining method as claimed in claim 19, wherein the step of obtaining the third parameter value in the second color space comprises:
obtaining the third parameter value of the average value of color in the second color space.

21. The skin undertone determining method as claimed in claim 17, wherein the first color space is a HSV color space, the first parameter value is a hue value in the HSV color space, and the second parameter value is a luminance value in the HSV color space.

22. The skin undertone determining method as claimed in claim 17, wherein the second color space is a RGB color space, and the third parameter value is a blue value in the RGB color space.

23. The skin undertone determining method as claimed in claim 17, further comprising:
determining a corresponding foundation color according to the skin undertone determined and outputting a foundation color recommendation message according to the foundation color.

24. The skin undertone determining method as claimed in claim 17, wherein the first image obtained comprises only the neck of the human body or only a portion of the neck of the human body.

25. An electronic device, comprising,
a storage unit configured to store a plurality of modules; and
a processing unit coupled to the storage unit and configured to access and execute the modules stored in the storage unit, the modules comprising:
an image obtaining module configured to obtain a first image; and
a determination module, obtaining a first parameter value and a second parameter value in a first color space according to the first image,
obtaining a third parameter value in a second color space according to the first image, and
determining a skin undertone of skin in the first image according to the first parameter value, the second parameter value, and the third parameter value,
wherein in the operation of determining the skin undertone of skin in the first image according to the first parameter value, the second parameter value, and the third parameter value,
the determination module determines the skin undertone of skin in the first image has warm undertones when the first parameter value is greater than a first threshold, the second parameter value is greater than a second threshold, the second parameter value is less than a third threshold, and the third parameter value is less than a fourth threshold, and
the determination module determines the skin undertone of skin in the first image has cool undertones when the first parameter value is less than the first threshold, the second parameter value is greater than a fifth threshold, the second parameter value is less than a sixth threshold, and the third parameter value is greater than a fourth threshold.

26. The electronic device as claimed in claim 25, wherein in the operation of obtaining the first image,
the image obtaining module obtaining a second image comprising a face and neck of a human body,
defining a plurality of reference points in a border of the face and neck in the second image,
selecting a first reference point he reference points, wherein a coordinate of the first reference point in a first direction is less than coordinates of other reference points in the reference points in the first direction,
determining a position of a baseline in the second image according to the coordinate of the first reference point in the first direction and a predetermined offset, wherein a coordinate of the baseline in the first direction is less than the coordinate of the first reference point in the first direction,
determining a feature area in the second image according to the reference points and the baseline, and
obtaining the first image according to the feature area.

27. The electronic device as claimed in claim 25, wherein in the operation of obtaining the first parameter value and the second parameter value in the first color space,
the determination module calculates an average value of color in the first image and
obtains the first parameter value and the second parameter value of the average value of color in the first color space.

28. The electronic device as claimed in claim 27, wherein in the operation of obtaining the third parameter value in the second color space,
the determination module obtains the third parameter value of the average value of color in the second color space.

29. The electronic device as claimed in claim 25, wherein the first color space is a HSV color space, the first parameter value is a hue value in the HSV color space, and the second parameter value is a luminance value in the HSV color space.

30. The electronic device as claimed in claim 25, wherein the second color space is a RGB color space, and the third parameter value is a blue value in the RGB color space.

31. The electronic device as claimed in claim 25, each of the modules further comprising:
an output module, the determination module determining a corresponding foundation color according to the skin undertone determined, and the output module outputting a foundation color recommendation message according to the foundation color.

32. The electronic device as claimed in claim 25, wherein in the operation of obtaining the first image, the first image obtained by the image obtaining module comprises only the neck of the human body or only a portion of the neck of the human body.

* * * * *